April 3, 1951
E. R. McCARTNEY
2,547,278
EXTRACTION OF ACIDIC IMPURITIES
AND MOISTURE FROM GASES
Filed June 12, 1948
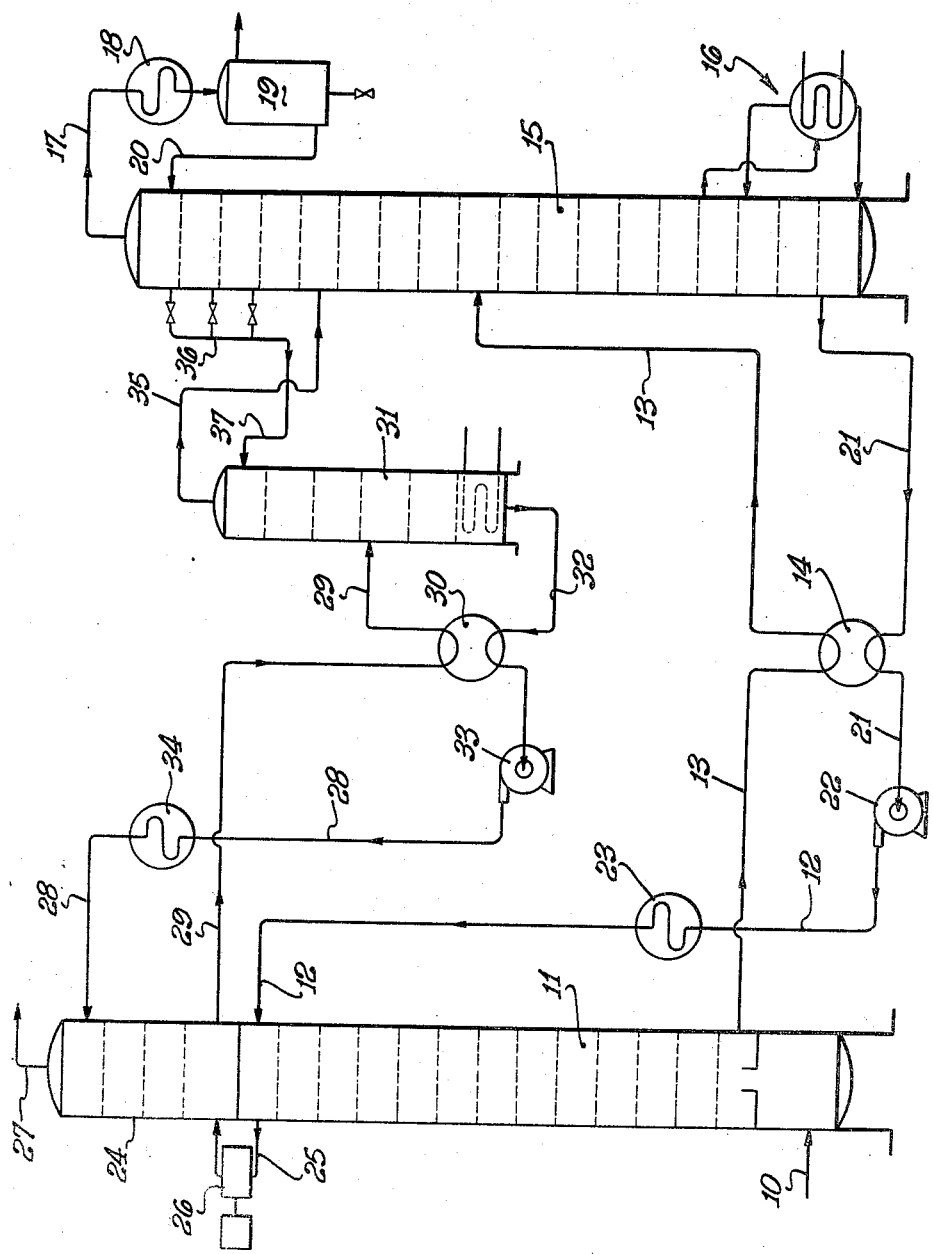
EDWARD R. McCARTNEY,
INVENTOR.
BY
ATTORNEY.

Patented Apr. 3, 1951

2,547,278

UNITED STATES PATENT OFFICE 2,547,278

EXTRACTION OF ACIDIC IMPURITIES AND MOISTURE FROM GASES

Edward R. McCartney, Altadena, Calif., assignor to The Fluor Corporation, Ltd., Los Angeles, Calif., a corporation of California Application June 12, 1948, Serial No. 32,679

7 Claims. (Cl. 23—2)

1

The process of the present invention is directed to the treatment of gaseous mixtures such as natural and refinery hydrocarbon gases, for the removal of moisture and acidic impurities, notably hydrogen sulfide and carbon dioxide. The invention has as its primary objective improvement of the two stage treating process disclosed in Patent No. 2,435,089 granted to me January 27, 1948, on "Gas Purification and Dehydration Process."

According to the patented process, the gas to be treated is contacted with a first treating solution containing an acid gas absorbent, and the solution is continuously circulated through a first heating zone or still to regenerate the absorbent by driving off the acidic impurities. Following removal of acidic constituents, the gas is contacted with a second solution containing a moisture absorbent, under conditions such that any carry-over of the acid gas absorbent from the first treating solution, is recovered together with absorbed moisture in the second solution. The latter is continuously circulated through and regenerated in a second heating zone, from which the evolved vapors are passed to the first heating zone for recovery of the acid gas absorbent carry-over and its return to the first mentioned treating cycle.

It is found that regeneration of the second solution in the second heating zone may result in vaporization and carry-over into the first heating zone, of quantities of the moisture absorbent, so that in the course of extended operation the second solution may become seriously depleted with respect to the moisture absorbent. My primary object now is to prevent depletion of the moisture absorbent in the second solution in a manner assuring its complete condensation in the second heating zone.

In accordance with the invention provision is made for returning condensate from the first heating zone to the second heating zone for use as reflux assuring condensation of all glycol vapors therein. Particularly contemplated is such return of condensate composed of substantially glycol-free amine solution which serves to correspondingly fix the top tray liquid composition in the second stage still, and therefore preclude the possibility of glycol carry-over.

The invention will be clearly understood from the following detailed description of an illustrative embodiment and process as illustrated by the accompanying drawing in flow sheet form.

The hydrocarbon gas to be treated and containing moisture and acidic impurities, is introduced through line 10 to a contactor column or section

2

11 within which the gas flows upwardly in intimate contact with a first treating solution introduced to the column through line 12 and containing an acid gas absorbent. Typically this first treating solution may consist of an appropriate straight amine solution, or a glycol-amine solution containing say 30 to 40 parts of amine, 20 to 30 parts glycol and the balance water. The rich solution, containing the absorbent acidic impurities, is discharged from the contactor through line 13 and exchanger 14 to the first heating zone or still 15. The latter is shown as a conventional bubble plate stripping column having the usual bottom reboiler assembly generally indicated at 16. Moisture and acid gases stripped from the solution pass overhead through line 17 to condenser 18, water condensate being returned from accumulator 19 through line 20 to the still as reflux. The lean first solution is recirculated from column 15 through line 21 and exchanger 14 to be discharged by pump 22 through cooler 23 and line 12 to the contactor 11.

Leaving the contactor 11, the gas is then treated for moisture extraction in a second column or top contactor section 24, which may be maintained under substantially the same pressure, or a greater pressure than the first stage contactor 11. For moisture absorption at increased pressure, the gas leaving column 11 through line 25 at say around 150 pounds, p. s. i. may be compressed by compressor 26 to an increased pressure, say around 500 pounds, p. s. i., for treatment in the second contactor 24. In passing upward through the latter to the treated gas outlet line 27, the gas is contacted with a moisture absorptive solution, typically an aqueous glycol solution, introduced through line 28. The rich second solution is discharged through line 29 and exchanger 30 into a second heating zone or still 31 wherein the solution is heated to a temperature sufficient to vaporize the absorbed moisture. The lean second solution leaving still 31 through line 32 and exchanger 30, is returned by pump 33 through line 28 and cooler 34 to the contactor 24.

The overhead from still 31 flows through line 35 into still 15 wherein any components of the second solution desired to be recovered, are condensed. As previously indicated, the gas stream entering the second stage contactor 24 may carry-over small amounts of amine from the contactor 11. Loss of the amine is prevented by its absorption in the second solution, and ultimate recovery of the amine is effected by its vaporization from the solution in still 31 and subsequent condensation in still 15. Dehydration of the second solution may also result in a small amount of glycol carry-over to the still 15, in the absence of some means for assuring retention of the glycol in the second stage cycle.

According to the invention, complete condensation of any glycol vaporized in still 31, is assured by refluxing the vapors with upper tray condensate return from the still 15. Accordingly, the latter is provided with one or more upper tray liquid draw-off lines 36 through which glycol-free condensate, consisting preferably of substantially pure aqueous amine solution, is passed through line 37 as reflux into the top rectifying section of the still 31. By virtue of its composition, the reflux assures condensation of all glycol vapors in the second stage still. The returned amine is of course vaporized and recovered by condensation in still 15.

I claim:

1. The process of treating a gaseous mixture for the removal of moisture and an acidic compound, that includes contacting the gas with a first liquid solution containing a moisture absorbent and an acid gas absorbent under conditions resulting in partial vaporization of the acid gas absorbent, then contacting the gas with a second solution containing a moisture absorbent separable by fractionation from said acid gas absorbent and in which is absorbed moisture and the vaporized acid gas absorbent, passing the spent first solution through a first heating zone to regenerate the solution by vaporization of the absorbed acidic compound, passing the spent second solution through a second heating zone to regenerate the second solution by vaporizing moisture and acid gas absorbent therefrom, condensing the vaporized acid gas absorbent from the resulting vapors and recovering the condensed acid gas absorbent in said first heating zone, returning condensate from said first heating zone to the second heating zone to prevent loss of the moisture absorbent from said second solution, and contacting gas to be treated successively with the regenerated first and second solutions.

2. The process of treating a gaseous mixture for the removal of moisture and an acidic compound, that includes contacting the gas with a first liquid solution containing a moisture absorbent and an acid gas absorbent under conditions resulting in partial vaporization of the acid gas absorbent, then contacting the gas with a second solution containing a moisture absorbent separable by fractionation from said acid gas absorbent and in which is absorbed moisture and the vaporized acid gas absorbent, passing the spent first solution through a first heating zone to regenerate the solution by vaporization of the absorbed acidic compound, passing the spent second solution through a second heating zone to regenerate the second solution by vaporizing moisture and acid gas absorbent therefrom, condensing the vaporized acid gas absorbent from the resulting vapors and recovering the condensed acid gas absorbent in said first heating zone, removing condensate from said first heating zone and refluxing the vapors generated in said second heating zone with the removed condensate to condense moisture absorbent out of the vapors, and contacting gas to be treated successively with the regenerated first and second solutions.

3. The process of treating a gaseous mixture for the removal of moisture and an acidic compound, that includes contacting the gas with a first liquid solution containing a moisture absorbent and an acid gas absorbent under conditions resulting in partial vaporization of the acid gas absorbent, then compressing and contacting the gas at substantially higher pressure with a second solution containing a moisture absorbent separable by fractionation from said acid gas absorbent and in which is absorbed moisture and the vaporized acid gas absorbent, passing the spent first solution through a first heating zone to regenerate the solution by vaporization of the absorbed acidic compound, passing the spent second solution through a second heating zone to regenerate the second solution by vaporizing moisture and acid gas absorbent therefrom, condensing the vaporized acid gas absorbent from the resulting vapors and recovering the condensed acid gas absorbent in said first heating zone, and contacting gas to be treated successively with the regenerated first and second solutions.

4. The process of treating a gaseous mixture for the removal of moisture and an acidic compound, that includes contacting the gas with a first solution containing a liquid amine acid gas absorbent under conditions resulting in partial vaporization of the amine, then contacting the gas with a second solution containing a liquid glycol absorbent in which is absorbed moisture and the vaporized amine, passing the spent first solution through a first heating zone to regenerate the solution by vaporization of the absorbed acid compound, passing the spent second solution through a second heating zone to regenerate the second solution by vaporizing moisture and amine therefrom, condensing the vaporized amine from the resulting vapors and recovering the condensed amine in said first heating zone, removing condensate from said first heating zone to the second heating zone to prevent loss of glycol from the second solution, and contacting gas to be treated successively with the regenerated amine and glycol absorbents.

5. The process of treating a gaseous mixture for the removal of moisture and an acidic compound, that includes contacting the gas with a first solution containing a liquid amine acid gas absorbent under conditions resulting in partial vaporization of the amine, then contacting the gas with a second solution containing a liquid glycol absorbent in which is absorbed moisture and the vaporized amine, passing the spent first solution through a first heating zone to regenerate the solution by vaporization of the absorbed acid compound, passing the spent second solution through a second heating zone to regenerate the second solution by vaporizing moisture and amine therefrom, condensing the vaporized amine from the resulting vapors and recovering the condensed amine in said first heating zone, removing condensate from said first heating zone and refluxing the vapors generated in said second heating zone with the removed condensate to condense glycol out of the vapors, and contacting gas to be treated successively with the regenerated amine and glycol absorbents.

6. The process of treating a gaseous mixture for the removal of moisture and an acidic compound, that includes contacting the gas with a first solution containing glycol and an amine acid gas absorbent under conditions resulting in partial vaporization of the amine, then contacting the gas with a second solution containing a glycol absorbent in which is absorbed moisture and the vaporized amine, passing the spent first solution through a first heating zone to regenerate the solution by vaporization of the absorbed acid compound, passing the spent second solution through a second heating zone to regenerate the second solution by vaporizing moisture and amine therefrom, passing the resulting vapors into said first heating zone and therein condensing the vaporized amine, contacting the vapors from said second heating zone with condensate from said first heating zone to condense glycol out of the vapors, and contacting gas to be treated successively with the regenerated first and second solutions.

7. The process of treating a gaseous mixture for the removal of moisture and an acidic compound, that includes contacting the gas with a first solution containing glycol and an amine acid gas absorbent under conditions resulting in partial vaporization of the amine, then contacting the gas with a second solution containing a glycol absorbent in which is absorbed moisture and the vaporized amine, passing the spent first solution through a first heating zone to regenerate the solution by vaporization of the absorbed acid compound, passing the spent second solution by vaporizing moisture and amine therefrom, passing the resulting vapors into said first heating zone and therein condensing the vaporized amine, refluxing the vapors generated in said second heating zone with substantially glycol-free, amine-containing condensate from said first heating zone to condense glycol out of the vapors, and contacting gas to be treated successively with the regenerated first and second solutions, contacting the vapors from said second heating zone with condensate from said first heating zone to condense glycol out of the vapors, and contacting gas to be treated successively with the regenerated first and second solutions.

EDWARD R. McCARTNEY.

REFERENCES CITED

The following references are of record in the file of this patent:

UNITED STATES PATENTS

| Number | Name | Date |
|---|---|---|
| 2,435,089 | McCartney | Jan. 27, 1948 |